United States Patent [19]
Noble

[11] Patent Number: 5,797,461
[45] Date of Patent: Aug. 25, 1998

[54] LAND CLEARING ATTACHMENT FOR BULLDOZERS

[75] Inventor: Terry B. Noble, Park Hill, Okla.

[73] Assignee: Rockland Manufacting, Inc., Bedford, Pa.

[21] Appl. No.: 786,249

[22] Filed: Jan. 22, 1997

[51] Int. Cl.$^6$ .................................................. E02F 3/28
[52] U.S. Cl. .............................. 172/200; 37/405; 414/724
[58] Field of Search ........................ 37/301, 302, 403, 37/405, 406, 407, 410, 903; 172/200; 414/704, 724, 739, 715

[56] References Cited

U.S. PATENT DOCUMENTS

| | | | |
|---|---|---|---|
| 3,148,787 | 9/1964 | Clark et al. | 37/405 X |
| 3,595,416 | 7/1971 | Perrotti | 37/405 X |
| 4,285,628 | 8/1981 | Jankowski | 37/406 X |
| 4,372,063 | 2/1983 | Work | 37/301 |
| 5,094,581 | 3/1992 | Lamb | 37/405 X |
| 5,123,185 | 6/1992 | Polland | 37/406 |
| 5,564,885 | 10/1996 | Staben, Jr. | 37/403 X |

*Primary Examiner*—Michael J. Carone
*Assistant Examiner*—Robert Pezzuto
*Attorney, Agent, or Firm*—Lalos & Keegan

[57] ABSTRACT

A land clearing attachment mountable on the moldboard of a bulldozer generally including a pair of transversely spaced, end tines, each having a shank portion physically connected on an upper end of the moldboard, a first tooth portion and a second tooth portion, a reinforcing member disposed between and secured to the end tines, and spaced from the upper end of the moldboard to provide an open space therebetween at least one first intermediate tine disposed between the end tines and rigidly secured to the reinforcing member, having a first tooth portion disposed in transverse alignment with the first tooth portions of the end tines and a second tooth portion disposed in transverse alignment with the second tooth portions of the end tines and a hydraulically actuated cylinder assembly operatively connecting the moldboard and the end tines for angularly displacing the attachment relative to the moldboard.

12 Claims, 3 Drawing Sheets

LAND CLEARING ATTACHMENT FOR BULLDOZERS

This invention relates to an attachment for bulldozers and more particularly to an attachment which may be mounted on the moldboard of a tractor and used in land clearing operations such as felling and removing standing trees, uprooting and removing tree stumps and raking underbrush and the like.

BACKGROUND OF THE INVENTION

In land clearing operations, it typically has been the practice to either utilize different types of equipment or different attachments on a single piece of equipment for performing various functions such as the felling and removal of standing trees, the uprooting and removal of tree stumps and the raking of underbrush and the like. Either the use of different pieces of equipment or the repeated attachment and detachment of different types of tools on a single piece of equipment, not only requires a substantial capital investment in equipment and tools by a land clearing operator but also a substantial loss of productivity. It thus has been found to be highly desirable to provide a single attachment mountable on the moldboard of a bulldozer that is capable of performing all of the aforementioned functions thus minimizing the capital investment of an operator and substantially increasing his productivity. It further has been found to be desirable to not only provide such a single attachment capable of performing all of such functions but one which is comparatively economical to manufacture, relatively easy to mount and operate and highly effective in performance.

SUMMARY OF THE INVENTION

The invention generally consists of an attachment mountable on the moldboard of a bulldozer including a pair of transversely spaced, end tines, each having a shank portion pivotally mounted on an upper end of the moldboard, a first tooth portion and a second tooth portion, a reinforcing member disposed between and secured to the end tines, and spaced from the upper end of the moldboard to provide an open space therebetween, at least one first intermediate tine disposed between the end tines and rigidly secured to the reinforcing member, having a first tooth portion disposed in transverse alignment with the first tooth portion of the end tines and a second tooth portion disposed in transverse alignment with the second tooth portion of the end tines and means operatively interconnecting the moldboard and the end tines for angularly displacing the attachment relative to the moldboard.

The displacing means is operable to angularly displace the attachment between an elevated position angularly displaced relative to a forwardly facing surface of the moldboard and a lower position disposed adjacent such surface. Preferably, the reinforcing member rigidly interconnecting the end tines consists of a box beam, there is a plurality of tines mounted on the reinforcing member having first tooth portions transversely aligned with the first tooth portions of the end tines and second tooth portions transversely aligned with the second tooth portions of the end tines, and the second tooth portions of the various tines are adapted to be received beneath a lower end of the moldboard when the attachment is in a position disposed adjacent the forwardly facing surface of the moldboard.

DESCRIPTION OF THE PREFERRED EMBODIMENT OF THE INVENTION

Figure 1:
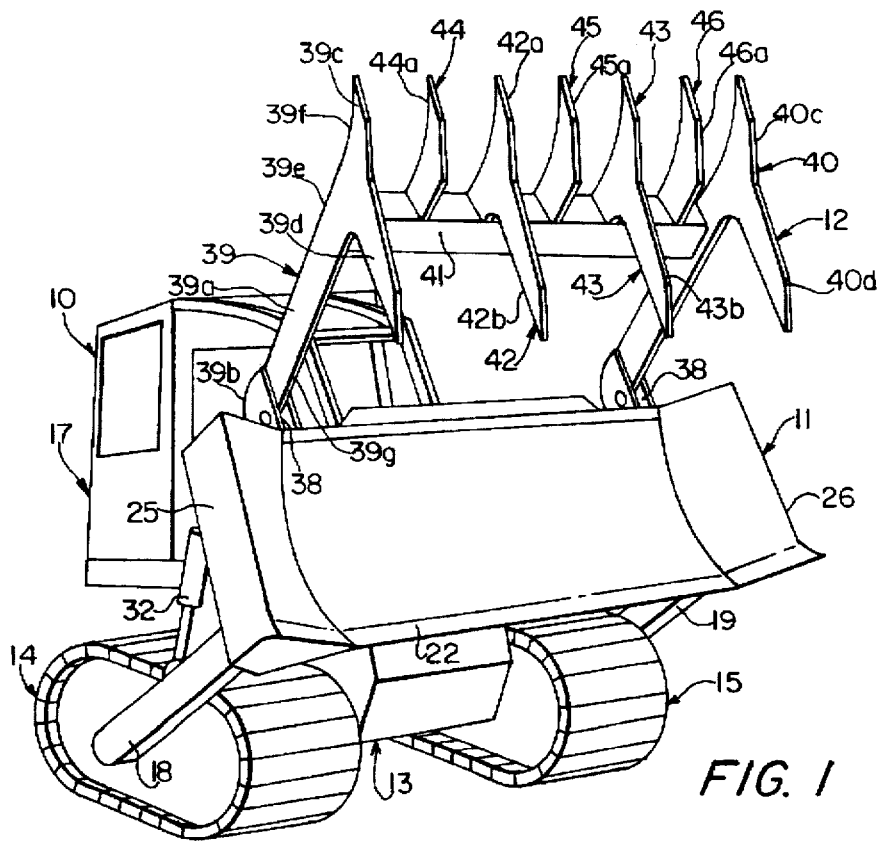
FIG. 1 is a perspective view of a crawler tractor equipped with a moldboard on which there is mounted an attachment embodying the present invention.
Figure 2:
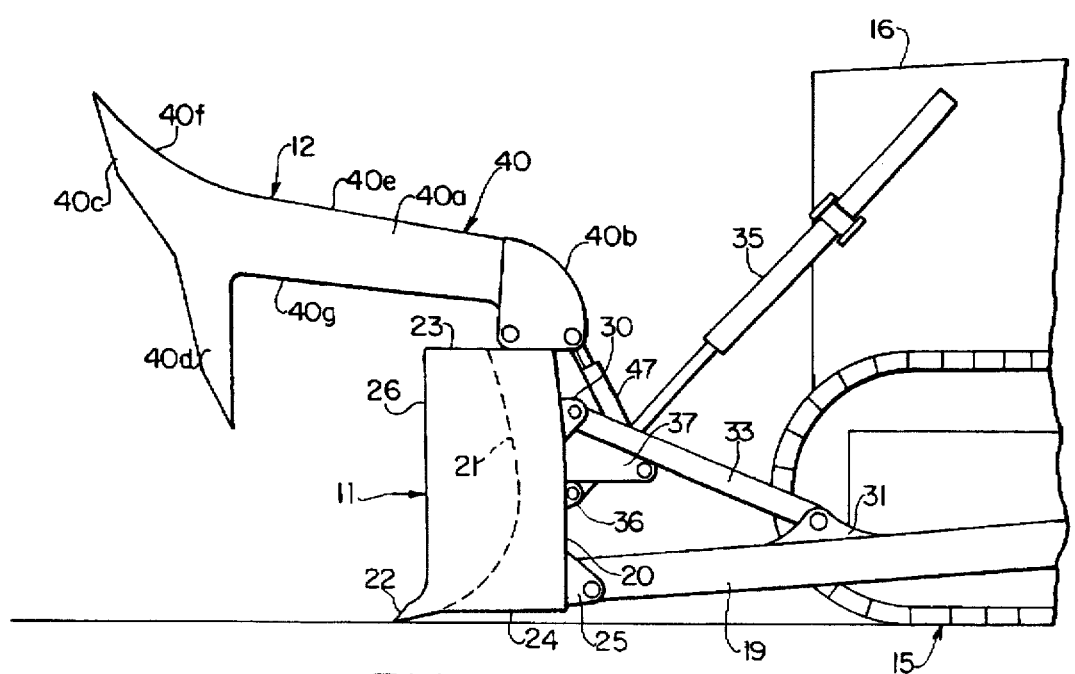
FIG. 2 is a side elevational view of the crawler tractor shown in FIG. 1, illustrating the attachment in an elevated position and having a portion of the crawler tractor broken away.

Referring to the drawings, there is illustrated a crawler tractor 10 provided with a moldboard 11 and an attachment 12 embodying the present invention, pivotally mounted on an upper end of the moldboard. The tractor is of a conventional construction, including a main frame or chassis 13 supported on a pair of crawler units 14 and 15, an engine compartment 16 mounted on the forward end of the main frame and an operator's cab 17 mounted on the rearward end of the main frame. Pivotally mounted on the outboard sides of the crawler units is a pair of forwardly projecting lift or push arms 18 and 19.

Moldboard 11 also is of a substantially conventional construction, including a rear wall 20, a forwardly facing, curved wall 21 provided with a cutting edge 22 at the lower end thereof, an upper wall 23 and a lower wall 24. Disposed at the ends of rear and front walls 20 and 21 is a pair of wing sections 25 and 26 having inwardly facing, curved walls 27 and 28, respectively.

The lower end of rear wall 20 is provided with a pair of transversely spaced brackets 29,29 which are connected to the front ends of lift arms 18 and 19 by means of a set of pins. Mounted higher on rear wall 20 is a pair of transversely spaced mounting brackets 30,30 which are connected to a pair of brackets 31,31 on the upper sides of lift arms 18 and 19 by means of a pair of struts 32 and 33 and a set of mounting pins. The moldboard is adapted to be lifted by means of a pair of fluid actuated cylinder assemblies 34 and 35 operatively interconnecting side walls of engine compartment 16 and a set of brackets 36,36 also provided on the rear wall of the moldboard. In addition, the moldboard is provided with a pair of transversely spaced brackets 37,37 mounted on rear wall 20 and a pair of transversely spaced brackets 38,38 mounted on upper wall 23, each of which is disposed in substantially the same longitudinally disposed, vertical plane of a mounting bracket 37.

Figure 3:
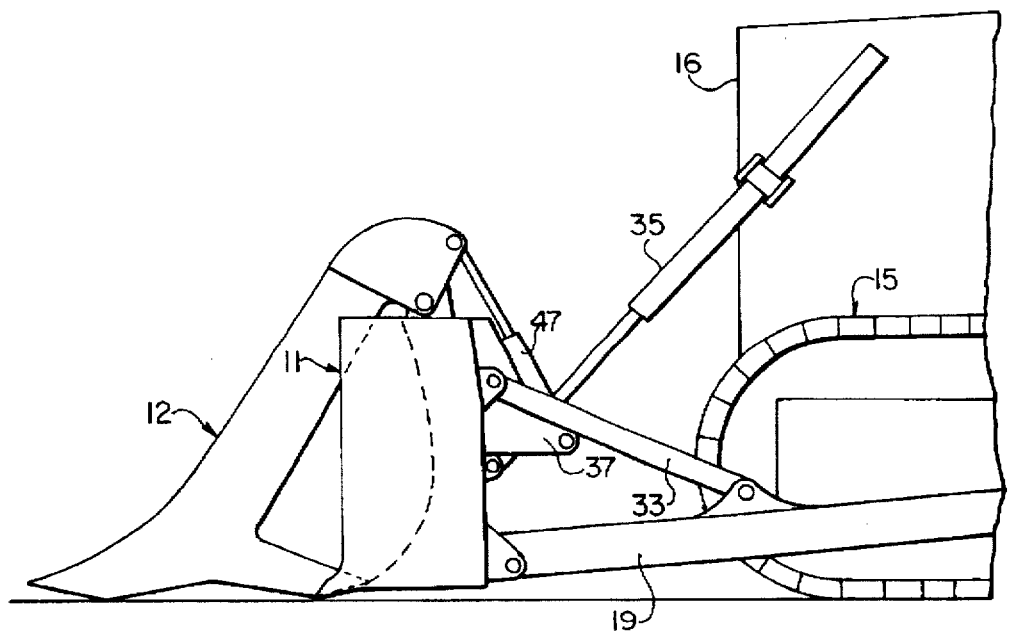
FIG. 3 is a view similar to the view shown in FIG. 2, illustrating the attachment in a lowered position.
Figure 4:
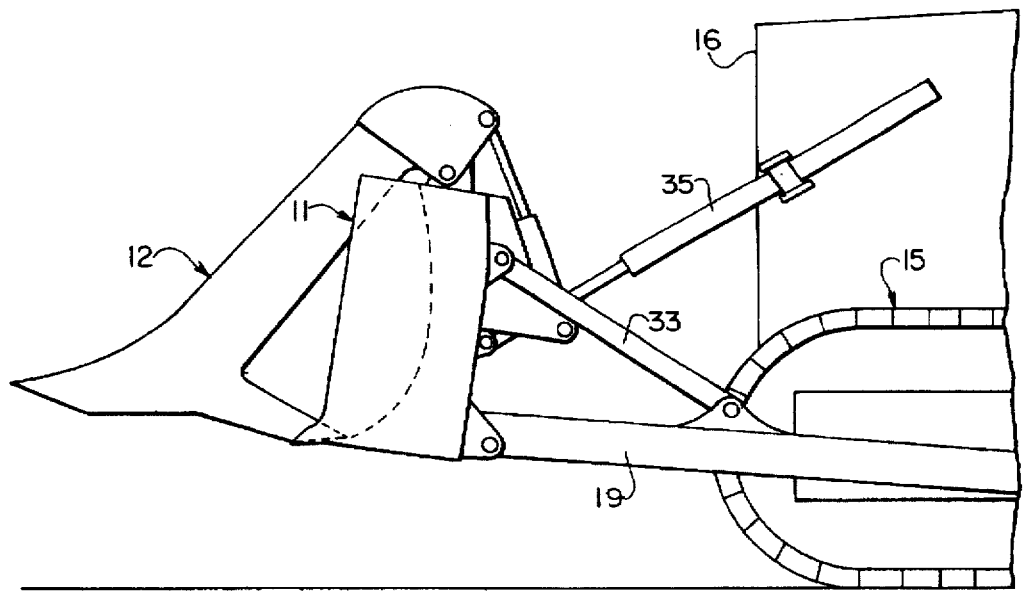
FIG. 4 is a view similar to the view shown in FIG. 3, illustrating the moldboard in an elevated position.
Figure 5:
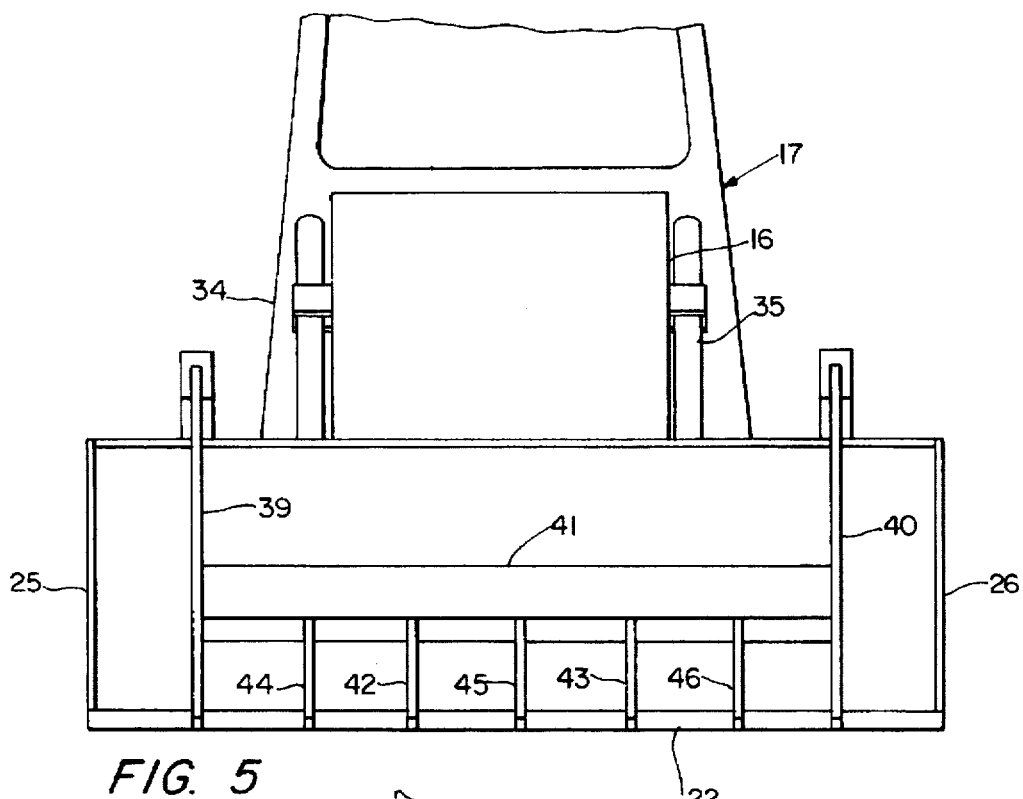
FIG. 5 is a front view of the crawler tractor shown in FIGS. 1 through 4.

As best seen in FIGS. 1 and 5, attachment 12 is pivotally connected to the upper edge of the moldboard and includes a pair of elongated, end tines 39 and 40, a reinforcing member 41, a first set of intermediate tines 42 and 43 and a second set of intermediate tines 44, 45 and 46. End tine 39 consists of a shank portion 39a, a crank portion 39b pivotally connected to a bracket 38, a first tooth portion 39c and a second tooth portion 39d. Shank portion 39a is provided with an outer edge 39e which is rectilinear along a greater part of its length and merges gradually with an outwardly curved edge 39f of tooth portion 39c. Inner edge 39g of shank portion 39a is rectilinear along the length thereof and is adapted to engage cutting edge 22 of the moldboard when the attachment is in the lowered position as shown in FIGS. 3 and 4.

End tine 40 is identical in configuration to end tine 39 and is disposed in transverse alignment therewith. It includes a shank portion 40a, a crank portion 40b pivotally connected to a bracket 38, a first tooth portion 40c aligned transversely with tooth portion 39c and a second tooth portion 40d transversely aligned with tooth portion 39d. Upper edge 40e of shank portion 40a also is rectilinear along the greater part of its length merging gradually into curved outer edge 40b of tooth portion 40c. Inner edge 40g of shank portion 40a also is rectilinear and is adapted to engage cutting edge 22 when the attachment is in the lowered position.

Reinforcing member 41 essentially consists of a box beam disposed transversely and is rigidly secured by welding to the inner sides of the end tines. The member is spaced from and parallel to the upper end of the moldboard providing a large opening for the operator to see through, unobstructed by the attachment. The first set of intermediate tines 42 and 43 are rigidly secured to the reinforcing member by welding and are spaced between the end tines. Such tines are provided with first tooth portions 42a and 43a configured similarly to and disposed in transverse alignment with tooth portions 39c and 40c, and tooth portions 42b and 43b configured similarly to and transversely aligned with tooth portions 39d and 40d. Intermediate tines 44, 45 and 46 also are secured to member 41 by welding and are disposed between end tines 39 and 40 and intermediate tines 42 and 43. They are provided with tooth portions 44a and 46a which also are configured similarly to and aligned transversely with tooth portions 39c and 40c of the end tines.

The attachment is adapted to be angularly displaced between an upper, open position and a lower, closed position by means of a pair of fluid actuated cylinder assemblies 47,47, one of which operatively interconnects a bracket 37 and crank 39d and the other of which operatively interconnects a bracket 37 and crank portion 40d. Suitable controls for the cylinder assemblies are provided in the operator's cab which may be operated to lift and lower the moldboard and pivot the attachment relative to the moldboard.

As best shown in FIGS. 3 and 5, when the attachment is in its lower, closed position, the lower, rear edges of tine shank portions 39a and 40a will engage cutting edge 22, crossbeam member 41 will be disposed just above cutting edge 22 and tooth portions 39d, 40d, 42b and 43b will be positioned below the moldboard and rearwardly of the cutting edge. The forwardly disposed, bottom surfaces of the forwardly projecting tooth portion 39c, 40c, 42a, 43a, 44a and 45a will be disposed substantially parallel to the ground, and the gradual downwardly and forwardly curved contours of the leading edges of the forwardly projecting tooth portions would be positioned to wedge and upwardly displace any brush, roots, stumps and the like as the attachment is advanced forwardly.

Figure 6:
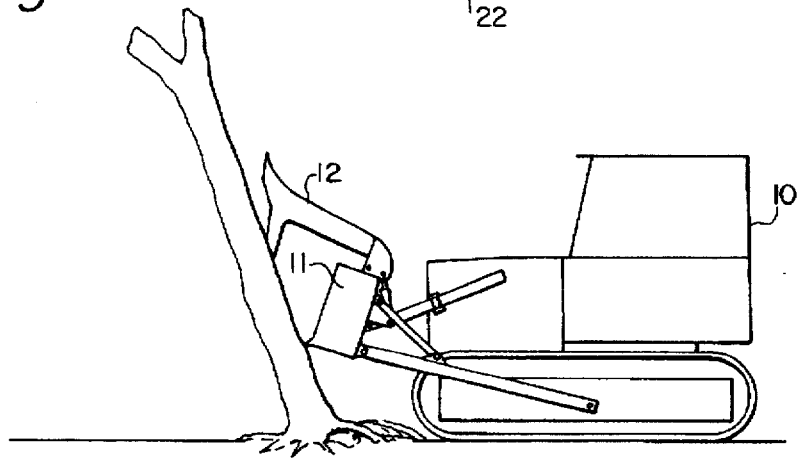
FIG. 6 is a side view of the crawler tractor shown in FIGS. 1 through 5, illustrating the manner in which the invention is used in felling a standing tree.
Figure 7:
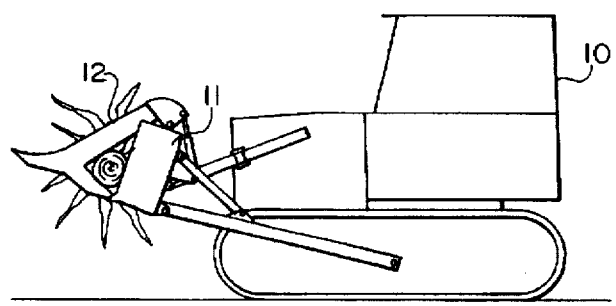
FIG. 7 is a side view of the crawler tractor shown in FIGS. 1 through 6, illustrating the manner in which the invention may be used in grappling and transporting a felled tree.

In the use of the embodiment of the invention as described in a land clearing operation, the moldboard may be elevated and the attachment may be pivoted to an upper, open position as shown in FIG. 6 to permit the moldboard and attachment to engage and fell a standing tree as the tractor is advanced in the conventional manner. A felled tree then may be grappled as shown in FIG. 7 to transport the felled tree to a remote location. With the trunk of the felled tree clamped against the moldboard by the attachment, it will be appreciated that tooth members 39d, 42b, 43b and 40d are adapted to engage the underside of the tree to prevent it from falling loose of the grip of the attachment.

For uprooting tree stumps or raking undergrowth or debris, the moldboard may be lowered and the attachment may be pivoted downwardly against the moldboard to permit such operations.

It is contemplated that the tine members each be cut from plate steel and that they be attached to a steel box beam in the manner as previously described. The simple construction of the attachment provides not only a highly effective and versatile working tool but a tool which is easy and economical to manufacture.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. A land clearing attachment mountable on a moldboard of a bulldozer comprising:

a pair of transversely spaced, end tines, each having a first tooth portion, a second tooth portion, and a shank portion pivotally connected to an upper end of said moldboard, a reinforcing member being secured between said end tines apart from said upper end of said moldboard forming a non-overlapping open space therebetween;

at least one first intermediate tine being secured to said reinforcing member, having a first intermediate tooth portion disposed in transverse alignment with said first tooth portion and a second intermediate tooth portion disposed in transverse alignment with said second tooth portion; and means operatively interconnecting said moldboard and said end tines for angularly displacing said attachment relative to said moldboard.

2. An attachment according to claim 1 wherein said displacing means is operable to angularly displace said attachment between an elevated position angularly displaced relative to a surface of said moldboard and a lower position disposed adjacent said surface.

3. An attachment according to claim 1 wherein said second tooth portions of said tines are received below a lower end of said moldboard when said attachment is angularly displaced and caused to be disposed adjacent a surface of said moldboard.

4. An attachment according to claim 1 wherein the shank portion of each of said end tines is engageable with a lower edge of said moldboard when said attachment is angularly displaced and caused to be disposed adjacent a surface of said moldboard.

5. An attachment according to claim 1 wherein said first and second tooth portions project in opposite directions.

6. An attachment according to claim 1 wherein an edge of the shank portion of each of said end tines gradually merges into an edge of the first tooth portion thereof, which gradually curves outwardly therefrom.

7. An attachment according to claim 1 wherein the second tooth portion of each of said end tines is disposed substantially perpendicular to the shank portion thereof whereby upon said moldboard and attachment grappling an elongated object therebetween, said second tooth portion will prevent a displacement of said object from between said moldboard and said attachment.

8. An attachment according to claim 1 including at least one second intermediate tine disposed between said end tines and rigidly secured to said reinforcing member, having a first tooth portion disposed in transverse alignment with said first tooth portions of said end tines.

9. An attachment according to claim 8 wherein said second intermediate tine is disposed between an end tine and a first intermediate tine.

10. An attachment according to claim 8 wherein said second intermediate tine is disposed between a pair of first intermediate tines.

11. An attachment according to claim 1 wherein said reinforcing member comprises a box beam.

12. An attachment according to claim 1 wherein said displacing means comprises a pair of fluid actuated cylinder assemblies.

* * * * *

UNITED STATES PATENT AND TRADEMARK OFFICE
CERTIFICATE OF CORRECTION

PATENT NO. : 5,797,461
DATED : August 25, 1998
INVENTOR(S) : Noble

It is certified that error appears in the above-identified patent and that said Letters Patent is hereby corrected as shown below:

Column 4, claim 1, line 39, insert --displacing-- before the word "means".

Signed and Sealed this

Sixteenth Day of February, 1999

Attest:

Attesting Officer

Acting Commissioner of Patents and Trademarks